United States Patent [19]

Parken

[11] Patent Number: 5,010,583

[45] Date of Patent: Apr. 23, 1991

[54] REPEATER FOR A WIDE AREA COVERAGE SYSTEM

[75] Inventor: William D. Parken, Wilton Manors, Fla.

[73] Assignee: Motorola, Inc., Schaumburg, Ill.

[21] Appl. No.: 415,818

[22] Filed: Oct. 2, 1989

[51] Int. Cl.$^5$ ............................................ H04B 17/00
[52] U.S. Cl. ........................................ 455/9; 455/15; 455/51; 455/135
[58] Field of Search ................... 455/9, 10, 15, 18, 20, 455/22, 24, 51, 67, 226, 133–136

[56] References Cited

U.S. PATENT DOCUMENTS

| | | | |
|---|---|---|---|
| 4,475,246 | 10/1984 | Batlivala et al. | 455/18 |
| 4,573,207 | 2/1986 | Smith et al. | 455/54 |
| 4,578,815 | 3/1986 | Persinotti | 455/15 |
| 4,696,052 | 9/1987 | Breeden | 455/51 |
| 4,890,332 | 12/1989 | Takahashi | 455/67 |

Primary Examiner—Curtis Kuntz
Attorney, Agent, or Firm—Robert S. Babayi

[57] ABSTRACT

A repeater for a wide area coverage multiple repeater system (100) includes a receiver (220) and a transceiver (230). The receiver (220) receives a received signal from a portable or mobile communication unit (130) on an inbound channel. The received signal is routed to a receive signal strength indicator (RSSI), a bit error rate (BER) detector, or a similar devices for differentiating a received signal quality characteristic. The transceiver (230) includes a transmitter (232) for repeating the received signal on an outboard channel and a receiver (234) for monitoring presence of an outboard channel activity. A controller (260) enables the transmitter (232) to retransmit the received signal, based on the received signal quality characteristic, and in absence of the outboard channel activity.

2 Claims, 1 Drawing Sheet

REPEATER FOR A WIDE AREA COVERAGE SYSTEM

TECHNICAL FIELD

This invention relates generally to the field of repeaters, in particular those repeaters used in a system for providing a substantially wide area coverage.

BACKGROUND

Repeater systems are used to provide communication coverage to a substantially wide area. A repeater system may include two or more repeaters, wherein each repeater covers a portion of the coverage area. Each repeater includes a receiver which receive a radio frequency (RF) received signal from a portable or mobile communication unit on an inbound channel, and a transmitter which repeats (or retransmits) the received signal on an outbound channel. However, it two or more repeaters transmit the repeated signal simultaneously (simulcast), transmission collisions may occur causing the repeated signal to become distorted.

In a conventional repeater system simulcast is avoided by activating only a desired repeater in the system. The desired repeater is activated via a unique preamble or private line (PL) code. The received signal is modulated by a PL code, and activates a particular repeater in the system. However, a user must know the location of each repeater and activates a correct repeater as he travels around the coverage area. The activation of a desired repeater may be accomplished by slaving multiple PL codes to the inbound channel and providing a switch on the communication unit to select the desired PL code. The user by switching the PL codes activates different repeaters. This method is undisired, because it requires user intelligence for knowing the repeater location and user interaction for manually switching the PL codes.

Another wide area coverage system may include geopraphically distributed remote receivers, a public switching telephone network (PSTN), and a central transmitter. The satellite receivers receive the received signal and route it to the PSTN through telephone landlines. A voting means selects the best received signal based on a predetermined signal quality characteristic, such as signal to noise ratio, and routes the received signal to a single central transmitter for retransmission. The central transmitter is a substantially high power transmitter and covers the coverage area. In this system user's manual interaction is not required, and the system provides repeater intelligence,. However, this system is costly and complicated and requires utilization of dedicated landlines.

SUMMARY OF THE INVENTION

Accordingly, it is an object of the present invention to provide a repeater that eliminates the need for user interaction.

Briefly, according to the invention, a repeater includes receiver means for receiving and monitoring a received signal on an inbound channel or an outbound channel. A determination means determines a received signal quality characteristic. A transmitter means provides for repeating the received signal on the outbound channel. The receiver means monitors the outbound channel for presence on an outbound channel activity. A controller means activates the transmitter means in response to the received signal quality characteristic, when no outbound channel activity is present.

DETAILED DESCRIPTION OF THE PREFERRED EMBODIMENT

Figure 1:
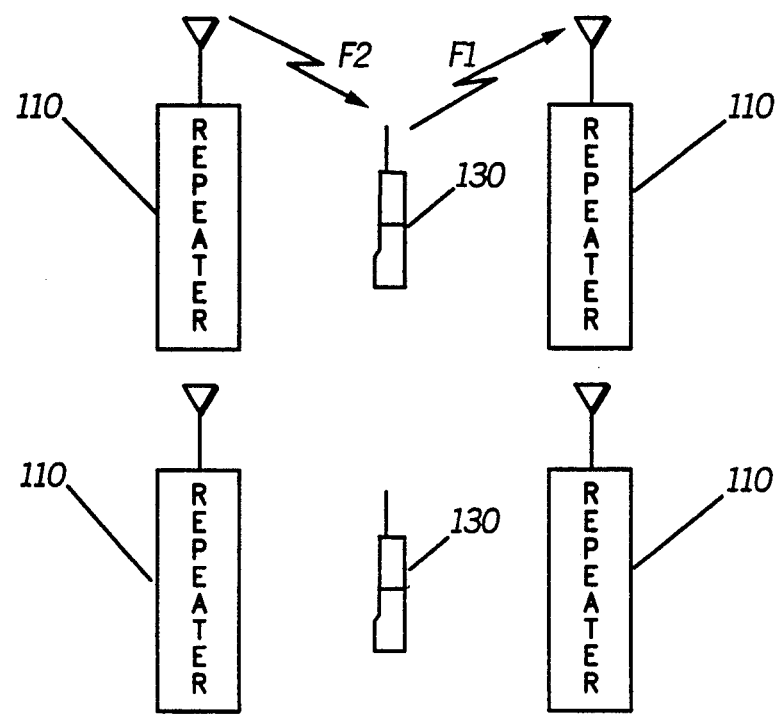
FIG. 1 is a block diagram of a wide area coverage system, which utilizes repeaters of the present invention.

Referring to FIG. 1, a wide area coverage repeater system 100 includes a plurality of identical repeaters 110, and a plurality of portable communication units 130. The number of repeaters 110 in the system 100 may depend on such system requirement as the coverage area and user access time. In the preferred embodiment of the invention, four repeaters 110 provide the optimum system performance. Operationally, the repeaters 110 receive a received signal from the portable communication units 130 on an inbound channel F1, and retransmits or repeats a repeated signal on an outbound chanel F2. The communication unit 130 may be a suitable transceiver, such as a Saber two-way portable radio manufactured by Motorola Inc. which comprises a transmitter (not shown) tuned to transmit on the inbound channel F1 and a receiver (not shown) tuned to receive on the outbound channel F2. Generally, the received signal is modulated by a message signal, which may be an analog voice signal, a digitally encrypted voice privacy signal or a digital data signal. It may be appreciated that more than one repeater 110 may receive the received signal. According to the present invention, only one repeater 110 is selected to repeat the received signal. The repeaters 110 monitor the outbound channel F2 for presence of a channel activity. The repeaters 110 after receiving the received signal determine a quality characteristic, such as the received signal strength, and classify the quality characteristic. Subsequently, one of the repeaters 110 based on the classification of the quality characteristic retransmits the received signal, if no outbound channel activity is present. The communication units 130 receive the repeated signal on the outbound channel F2.

Figure 2:
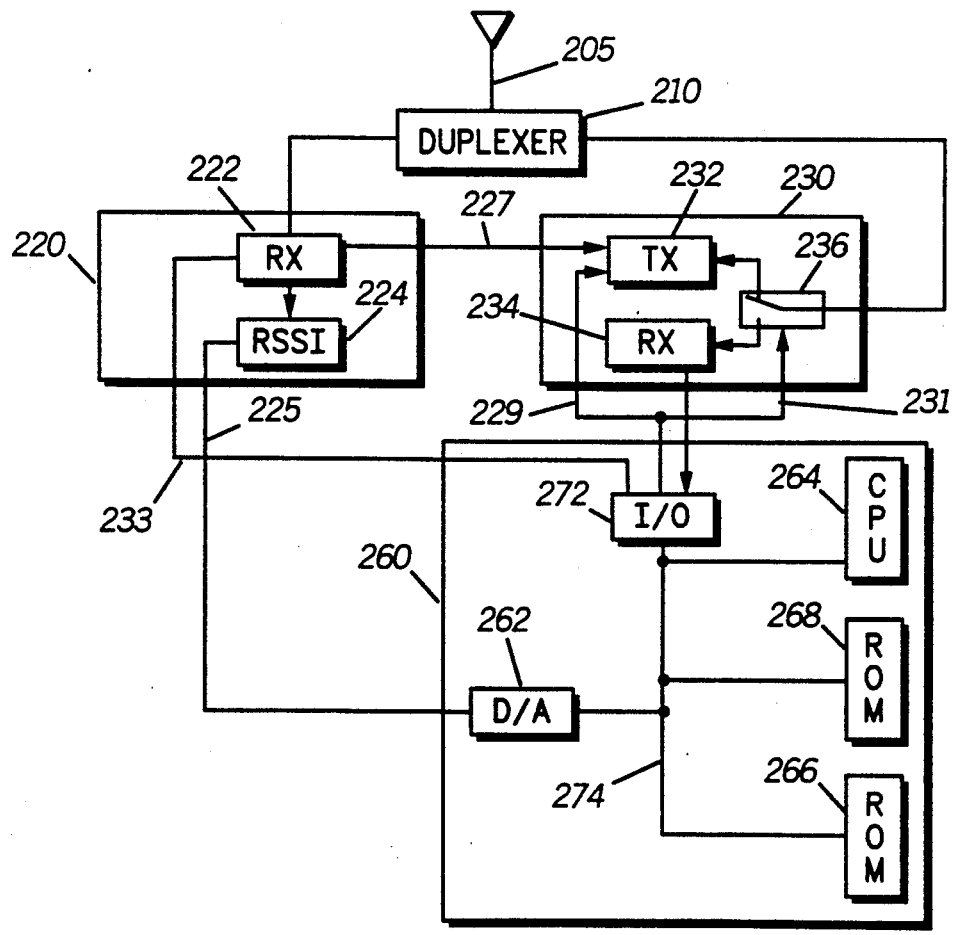
FIG. 2 is a block diagram of the repeater of the present invention.

Referring to FIG. 2, the repeater 110 of the present invention comprises a receiver 220, a transceiver 230, and a controller 260. In the preferred embodiment of the repeater 110 an antenna 205 receives the received signal and couples it to the receiver 220 through a well known duplexer 210. The duplexer 210 is turned for simultaneous reception and transmission on the inbound channels F1 and outbound channel F2. The receiver 220 may be of any suitable type, such as the receiver used in the Saber portable radio, and is turned to receive on the inbound channel F1. The receiver 220 includes a local oscillator (LO), a intermediate frequency (IF), a squelch and demodulator circuitry. These circuitry in combination are shown in block 222. When the receiver 220 receives the received signal, a squelch signal 233 is generated. Subsequently, the received 220 demodulates the received signal and produces a message signal 227. Additionally, the received 220 includes a received signal strength indicator (RSSI) circuit 224. The RSSI circuit generates a RSSI signal 225 having a DC voltage level proportional to the received signal level induced at the antenna 205. Accordingly, the RSSI signal 225 variation corresponds to the variation of the received signal strength (or power). As will be described latter, the RSSI signal 225 and the squelch signal 233 are applied to the controller 260 for further processing. Accordingly, the RSSI circuit 224 constitutes determination means for determining a received signal quality characteristic.

The controller 260 may be a suitable microcomputer, such as a MC68HC11 microcomputer manufactured by Motorola Inc. The controller 260 comprises a central processing unit (CPU) 264, a random access memory (RAM) 226, a read only memory (ROM) 268, an input/output (I/O) port 272, and an analog to digital (A/D) converter 262. Various portions of the controller 260 interact with each other through a data and an address bus combinationally shown as bus 274. The controller 260 provides the intelligence for the repeater 110, and as later described controls the operation thereof.

The transceiver 230 includes a transmitter 232, a receiver 234, and a transmit/receive (T/R) switch 236. The T/R switch couples the antenna 205 to the receiver 234 or the transmitter 232 through the duplexer 210. A control signal 229 generated by the controller 260 controls switching of the T/R switch 236, and activation of the transmitter 232. The transmitter 232 may be of any suitable type and includes, a modulator, a LO, an IF and a RF power amplifier circuitry to remodulate and retransmit the message signal 227 on the outbound channel F2 as is conventional. The T/R switch couples the antenna 205 to the receiver 234, when the transmitter is not activated. The receiver 234 may be similar to the receiver 220, but that it is tuned to receive on the outbound channel F2. The receiver 232 constantly monitors the outbound channel F2 for presence of any channel activity. When channel activity is present, a squelch signal 231 is generated by the receiver 234. The squelch signal 321 is inputted to the controller 260 to inform the controller of the presence of channel activity on the outbound channel F2. One of ordinary skill in the art appreciates that just one receiver may be used in place of the receivers 220 and 232 for receiving on the inbound channel and monitoring of the outbound channel. In this arrangement, the receiver, under the control of the contoller 260, may switch from the inbound channel to the outbound channel for a short time period for monitoring the outbound channel. However, in this configuration, the duplexer may no longer be required.

Hereinafter, the operation of the controller 260 will be described. One of ordinary skill in the art will appreciated that the operation of the controller may be a combination of discrete steps, which are programmed and stored in the ROM 268. Programming of a controller is well known, and may be easily achieved by a person of ordinary skill in the art. The squelch signals 231 and 233 are inputted to the I/O port 272, and the control signal 229 is outputted from the I/O port 272. The controller upon detection of the sequlch signal 233 enables the A/D converter 262 to receive the RSSI signal 255. The A/D converter 262 digitizes the DC voltage level of the RSSI signal 225.The RSSI signal 255 is then classified to determine a retransmission delay time. The retransmission delay is a time period after which the control signal 229 is generated by the controller 260 in order to activate the transmitter 232. Classification of the received signal level to determine the retransmission delay may be achieved by many methods, such as comparing the RSSI signal level with a table which stores the retransmission delay for different RSSI levels. The retransmission delay is selected such that a stronger received signal level, provides a shorter retransmission delay. After the retransmission delay has elapsed, the controller checks the I/O port 272 for presence of the squelch signal 231. If the squelch signal 231 is not present, the transmitter 232 is activated and the message signal 227 is repeated. However, If the squelch signal 321 is present, it is assumed that another repeater 110 has received a stronger received signal and has repeated it faster than other repeaters in the system 100. Accordingly, the other repeaters 110 would refrain from repeating the received signal.

One of ordinary in the art may appreciate the configuration of system 100 allows the outbound channel F2 to function as a control channel as well. Accordingly, the controller 260 may be programmed to apply various local area networking (LAN) rules for selecting a repeater. These rules could make use of random or arbitrary delay before transmission, stop transmit and monitor outbound channel, and other LAN rules to prevent or reduce transmission collisions and to allow the best or better repeater 110 to be selected for repeating the received signal. The selection of a particular LAN rule, may affect user access time. The user access time is reduced as simpler Lan rules are applied. On the other hand, more complicated LAN rules may reduce or prevent transmission collisions. Therefore, a trade off may be made in selecting a particular LAN rules. Additionally, other qualities of the received signal such as signal to noise ratio, or encryption bit error rate, etc. may be used as selection criteria for repeating the received signal.

What is claimed is:

1. A repeater for receiving a signal on an inbound channel and transmitting said signal on an outbound channel, comprising:
   a first receiver means for receiving said signal on said inbound channel,
   determination means for determining quality characteristic of said signal when received on said inbound channel,
   a second receiver means for monitoring presence of a channel activity on said outbound channel,
   controller means responsive to presence of said channel activity on said outbound channel and said quality characteristic of said signal for generating a control signal:
   transmitter means responsive to said control signal for transmitting said signal on said outbound channel.

2. The repeater of claim 1, wherein said contoller provides a delay before generating said control signal, said delay corresponding to said quality characteristic.

* * * * *